G. H. BABCOCK.
WINDOW SIGN.
No. 10,952. Reissued Aug. 21, 1888.
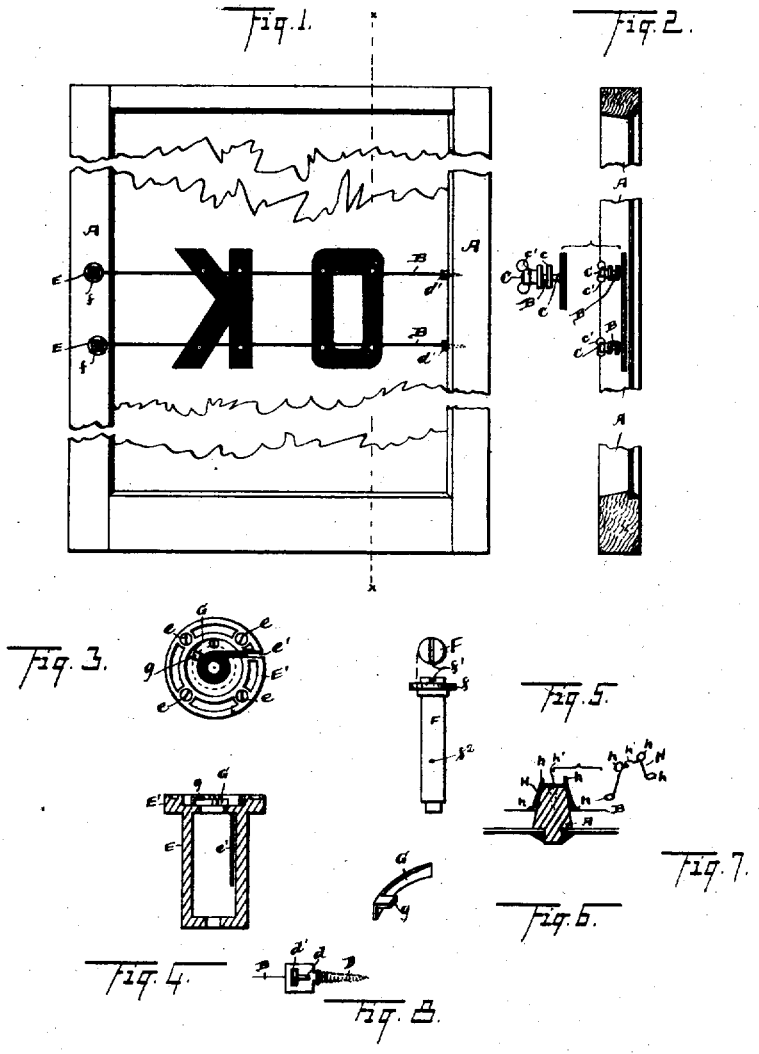
WITNESSES.
N. S. Amstutz.
Geo. W. King.
Geo. H. Babcock. INVENTOR.
By Leggett & Leggett Attorney.
N. PETERS, Photo-Lithographer, Washington, D. C.

UNITED STATES PATENT OFFICE.

GEORGE H. BABCOCK, OF CLEVELAND, OHIO.

WINDOW-SIGN.

SPECIFICATION forming part of Reissued Letters Patent No. 10,952, dated August 21, 1888.

Original No. 362,350, dated May 3, 1887. Application for reissue filed May 16, 1888. Serial No. 274,096.

*To all whom it may concern:*

Be it known that I, GEORGE H. BABCOCK, of Cleveland, in the county of Cuyahoga and State of Ohio, have invented certain new and useful Improvements in Window-Signs; and I do hereby declare the following to be a full, clear, and exact description of the invention, such as will enable others skilled in the art to which it pertains to make and use the same.

My invention relates to improvements in window-signs in which the letters of the sign are made of suitable material mounted on wires, the latter being stretched across the inside of the sash, to the end that the sign is easily removed for cleaning the window or for changing the sign, or other purpose, and that the breakage of the window does not necessarily affect the sign.

My invention also relates to the details of construction hereinafter described, and pointed out in the claims.

In the accompanying drawings, Figure 1 is an elevation of a window-sash with a sign mounted thereon embodying my invention. Fig. 2 is an elevation in transverse section on the line *x x* of Fig. 1. Figs. 3 and 4 are an elevation and section of a thimble that is set in the sash for attaching the wires. Fig. 5 is a side elevation and plan of a spindle that is made to operate in the thimble for tightening the wires. Fig. 6 is a view in perspective of a portion of a spring-pawl that is made to engage the ratchet of the spindle. Fig. 7 is a view in perspective and elevation in section showing a device for bringing the wires near the glass in passing a cross-bar of the sash. Fig. 8 illustrates the mechanism for detachably securing one end of the wires.

A represents a sash with wires B stretched across on the inside thereof, on which are suspended the letters of the sign, in the present instance O and K. The letters are made of any suitable material—for instance, glass, metal, &c.—and have on their inner faces attached, preferably, laterally-projecting screw-threaded studs C, for securing the letters to the wires. Each stud is provided with a jam-nut, *c*, and a thumb-nut, *c'*. These are arranged in the desired position on the stud to bring the letters the required distance from the window-pane, it being desirable usually to have the letters close to the pane of glass. By turning the thumb-nuts the wires B are pinched between the two nuts sufficiently tight to hold the letters in place. The letters are therefore easily removed from the wires for cleaning, repairs, or other purposes, and the letters may be changed in a few moments when a new sign is wanted. The wires may be secured to one side of the sash in any convenient manner; but I prefer the device shown in Fig. 8. This device somewhat resembles the ordinary screw-eye, having a screw-point, D, and a longitudinal slot, *d*, with a cross-bar, *d'*, to which the wire is attached. When the wire is loosened, by turning the cross-bar lengthwise of the slot it may be passed through the latter, and the wires may be thus detached without removing the screw-eye.

E is a thimble that is set on the opposite side of the sash, the same having a flange, E', with screw-holes *e*, for securing the thimble to the face of the sash. The thimble on one side has a slot, *e'*, extending to near the bottom of the thimble for the passage of the wire. The sash also is cut out to correspond with this groove.

F is a spindle on which the wire is wound for tightening the same. This spindle sets in the thimble, the latter having suitable bearings, as shown, at top and bottom for journaling the spindle. The spindle has a ratchet-wheel, *f*, that is engaged by a spring-pawl, G, the latter being attached to the outside of the flange E'. The pawl has a laterally-projecting lip, *g*, that overlaps the ratchet-wheel and holds the spindle in place in the thimble. The outer end of the spindle has a groove, *f'*, made to receive a screw-driver for turning the spindle, and has a hole, $f^2$, through which the end of the wire is passed for fastening the same. When the parts are in position, by turning the spindle the wire is drawn taut and held by means of the pawl.

When the sash has cross-bars, a bail, H, may be secured to each cross-bar A', (see Fig. 7,) the said bail having loops *h* for the passage of the wire, and a loop or hole, *h'*, for securing the bail to the cross-bar by means of a wood-screw. By means of the bail the wires B are brought within a suitable distance of the window-glass. A small hole might be made with a brad-awl or other tool through the cross-bar for the passage of the wire B, to accomplish the same purpose.

The wires should be quite small in diameter, and are preferably made of steel, on account of the great tensile strength of the latter, which would admit of using a very fine wire. The wires should be made black or of such color as, compared with the background, will render the wires as nearly invisible as possible.

In carrying out my invention various modifications may be had in the mechanical construction without departing from the spirit and purpose of my invention. For instance, other means than the screw-studs shown and described may be had for detachably securing the letters or characters to the wires, and so long as such devices admit of adjusting the letters or characters toward and from the window, would answer the purpose.

What I claim is—

1. In window-signs, the combination, with wires stretched across the window, of letters or characters forming the sign, the same being mounted on the wires, such letters and characters being detachably secured to the wires and made adjustable toward or from the window, substantially as set forth.

2. In window-signs, the combination, with wires stretched across the window and having removable letters or characters adjustably secured to such wires, of suitable devices for tightening the wires from one end of the same, said wires being detachably secured to the window at its other end, substantially as and for the purposes shown and described.

3. In window-signs, the combination, with wires stretched across the window, and letters or characters forming the sign mounted on the said wires, substantially as indicated, of a spindle mounted in the window sash or frame and a ratchet and pawl for tightening the wires, the parts being arranged substantially as described.

4. In window-signs, the combination, with wires stretched across the window and letters or characters forming the sign, the same being mounted on the said wires, of screw-threaded studs attached to the respective letters, said studs being provided with jam-nuts for embracing the wires, substantially as set forth.

5. In window-signs, the combination, with wires stretched across the window, letters or characters forming the sign mounted on such wires, and suitable devices for tightening the wires, of a screw-eye for holding the one end of the wire, said screw-eye having an elongated eye or slot, and a cross-bar attached to the wire, said cross-bar being adapted to span the slot and to pass through the slot when turned lengthwise of the same, substantially as set forth.

In testimony whereof I sign this specification, in the presence of two witnesses, this 6th day of July, 1887.

GEORGE H. BABCOCK.

Witnesses:
CHAS. H. DORER,
ALBERT E. LYNCH.